US007925043B2

(12) United States Patent
Kazmaier et al.

(10) Patent No.: US 7,925,043 B2
(45) Date of Patent: Apr. 12, 2011

(54) TACTILE SECURITY FEATURE FOR DOCUMENT AND SIGNATURE AUTHENTICATION

(75) Inventors: Peter M. Kazmaier, Mississauga (CA); Hadi K. Mahabadi, Mississauga (CA); Paul F. Smith, Oakville (CA); Chris A. Wagner, Toronto (CA); Gabriel Iftime, Mississauga (CA); Tyler B. Norsten, Oakville (CA)

(73) Assignee: Xerox Corporation, Norwalk, CT (US)

( * ) Notice: Subject to any disclaimer, the term of this patent is extended or adjusted under 35 U.S.C. 154(b) by 1147 days.

(21) Appl. No.: 11/613,759

(22) Filed: Dec. 20, 2006

(65) Prior Publication Data

US 2008/0151310 A1 Jun. 26, 2008

(51) Int. Cl.
*G06K 9/00* (2006.01)

(52) U.S. Cl. ........................................ 382/100

(58) Field of Classification Search .................. 382/100; 283/72; 726/26; 358/3.28; 162/140
See application file for complete search history.

(56) References Cited

U.S. PATENT DOCUMENTS 4,033,059 A * 7/1977 Hutton et al. .................. 283/91
4,443,820 A 4/1984 Mutoh et al.
5,371,798 A 12/1994 McWhorter
5,937,762 A 8/1999 Herbert
6,151,038 A 11/2000 Suzuki
6,220,687 B1 4/2001 Takahashi et al.
6,618,563 B2 9/2003 Oakeson et al.
6,644,764 B2 11/2003 Stephens, Jr.
6,766,056 B1 7/2004 Huang et al.
6,839,524 B2 1/2005 Yamaguchi et al.
6,862,583 B1 3/2005 Mazzagatte et al.
6,971,007 B1 11/2005 Currans
7,002,710 B1 2/2006 Van Liew et al.
7,199,911 B2 * 4/2007 Hudson et al. .................. 359/2
2003/0151246 A1 * 8/2003 Baldus et al. .................. 283/57

FOREIGN PATENT DOCUMENTS

WO WO983360 8/1998

OTHER PUBLICATIONS

Chovancova, V. Pekarovicova; Fleming, P.; Hot Melt Inks for 3D Printing; Center for Ink and Printability Research, Western Michigan University, Department of Paper Engineering, Chemical Engineering and Imaging; A-217 Parkview Campus, Kalamazoo, MI 49008-5462.

Chovancova, V. Pekarovicova; Fleming, P.; Production of 3D Structures in Printing; Western Michigan University, Department of Paper Engineering, Chemical Engineering and Imaging; A-217 Parkview Campus, Kalamazoo, MI 49008-5462.

* cited by examiner

*Primary Examiner* — John B Strege
(74) *Attorney, Agent, or Firm* — Michael J. Nickerson; Basch & Nickerson LLP

(57) ABSTRACT

A system and method create an authentication mark on a recording medium by depositing marking material on a medium in an image area to create a marking material image and to create a marking material authentication image. A predetermined amount of additional marking material is further deposited upon the medium in the authentication image area to increase an amount of marking material associated with the marking material authentication image in the authentication image area. The fixed marking material associated with the authentication image area is a tactilely perceptible authentication mark wherein the fixed marking material associated with the authentication mark has a height, with respect to a surface of the medium, that is tactilely perceptible.

16 Claims, 3 Drawing Sheets

TACTILE SECURITY FEATURE FOR DOCUMENT AND SIGNATURE AUTHENTICATION

BACKGROUND

With the general availability of high quality color reproduction, distinguishing an original from a copy and verifying, for example, a signature, on the original has become more difficult. More specifically, digital printers, scanners, and image editing software have made it possible for copies of legitimate documents to be made that are difficult to distinguish from the original.

One conventional approach to authenticating documents is the use of machine readable encoded data which is rendered onto a document or other physical media along with other information.

For example, authenticating information can be encoded into thousands of tiny, individual glyph elements. Each element consists of a small 45 degree diagonal line, as short as 1/100th of an inch or less, depending on the resolution of the printing and scanning that is used. Each glyph represents either binary 0 or binary 1, depending on whether the glyph slopes to the left or right. Sequences of glyphs can be used to encode numeric, textual, or other information. The glyphs are grouped together on the page, where the glyphs form unobtrusive, evenly textured gray areas, similar to a half-toned picture.

Another conventional approach to the problem of verifying document authenticity is the use of authenticating information embedded in a print, for example, a seal or a date and time. The embedded authenticating information catches the light when the print is tilted and can be seen as an additional and separate image. Moreover, watermarks, conventionally, have also been used to authenticate a document.

These various conventional methods of verifying a document share the feature that it is very difficult to reproduce the authenticating feature of the original on a conventional copier or scanner. Therefore, a copy of the original can be distinguished from the original.

However, the conventional methods of verifying a document have drawbacks. For example, glyphs need a device to decode the authenticating information. Moreover, conventional watermarks need a proper source of light to discern the authenticating information. In these various conventional methods, outside intervention; e.g., from either a machine (optical reader) or a light source; is needed to detect or discern the authenticating information.

Therefore, it is desirable to provide a method that enables authentication of an original document without the utilization of outside intervention; e.g. from either a machine (optical reader) or a light source. Moreover, it is desirable to provide a method that enables authentication of an original document through tactile perception. Furthermore, it is desirable to provide a method that enables authentication of an original document through tactile perception while preventing the authenticating information of the original document from being reproduced using conventional scanners and printers.

BRIEF DESCRIPTION OF THE DRAWINGS

The drawings are only for purposes of illustrating an embodiment and are not to be construed as limiting, wherein.

DETAILED DESCRIPTION

Figure 1:
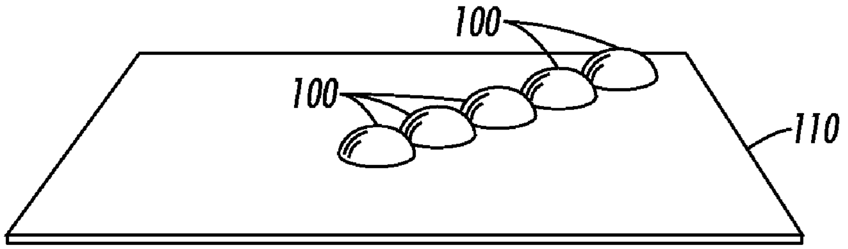
FIG. 1 depicts piles of marking material on paper.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts could be properly illustrated.

As noted above, it is desirable to provide a method that enables authentication of an original document without the utilization of outside intervention; e.g. from either a machine (optical reader) or a light source. Moreover, it is desirable to provide a method that enables authentication of an original document through tactile perception. Furthermore, it is desirable to provide a method that enables authentication of an original document through tactile perception while preventing the authenticating information of the original document from being reproduced using conventional scanners and printers.

Tactile perception is based upon the physical sense of touch and thus tactile perception can be realized without utilizing a source of light or optical reader. In contrast, the various conventional methods of authenticating an original document required visual perception.

Figure 2:
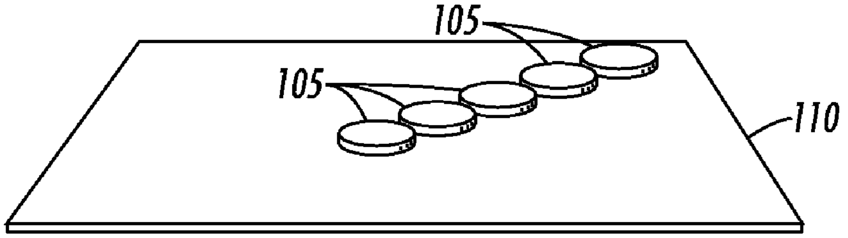
FIG. 2 depicts the piles of marking material of FIG. 1 after fusing.

FIG. 1 illustrates solid ink droplets 100 that have been deposited upon paper 110. The use of solid ink is an example of a marking material that can be used to generate tactilely perceptible images. Solid ink typically resides primarily on the surface of the paper creating a raised image. After initial jetting of the solid ink droplets 100 onto the paper 110, a conventional cold pressure transfusion can be utilized to fix the solid ink to the paper 110 so as to create a substantially permanent image. The fixed solid ink appears as flattened solid ink areas 105, as illustrated in FIG. 2. Repeated layering of solid ink in this manner may be used to generate an ink pile height that is tactilely perceptible.

Figure 3:
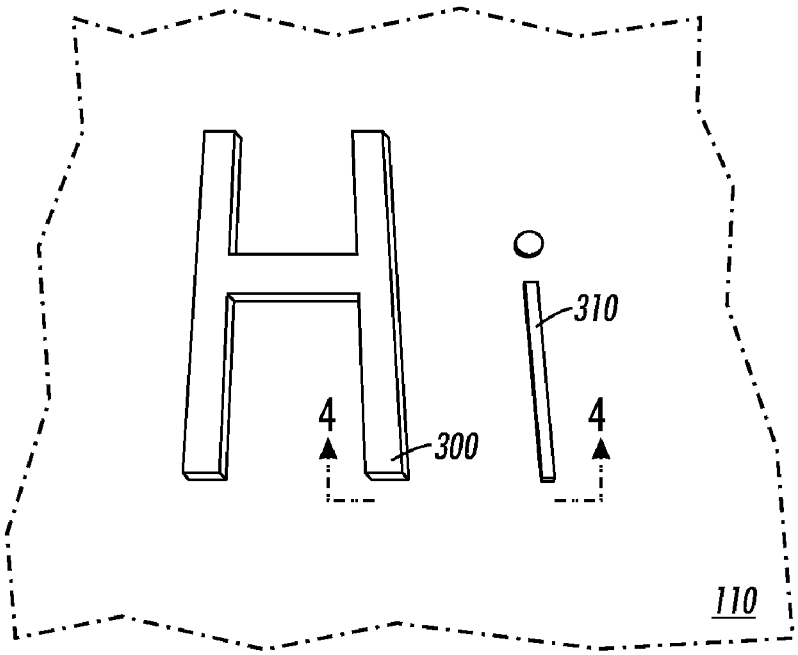
FIG. 3 depicts a tactilely perceptible authenticating mark and an image.
Figure 4:
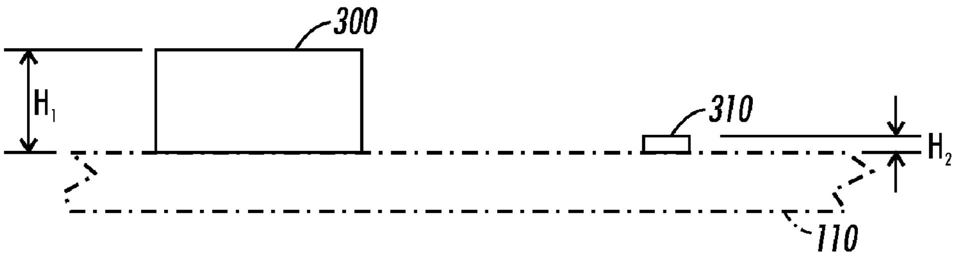
FIG. 4 is a side view of the tactilely perceptible authenticating mark and the image of FIG. 3 showing a marking material height.

FIG. 3 illustrates a top view of a tactilely perceptible character 300 with a tactilely non-perceptible character 310 on a document 110. The tactilely perceptible character 300 is created by applying additional marking material for character 300 as compared to the amount of marking material deposited for tactilely non-perceptible character 310. If the height $H_1$ of the marking material for character 300, as illustrated in FIG. 4, is at least 31 microns, the printed image for character 300 is thereby tactilely perceptible. On the other hand, if the height $H_2$ of the marking material for character 310, as illustrated in FIG. 4, is about 10 microns, the printed image for character 310 is thereby tactilely non-perceptible.

Figure 5:
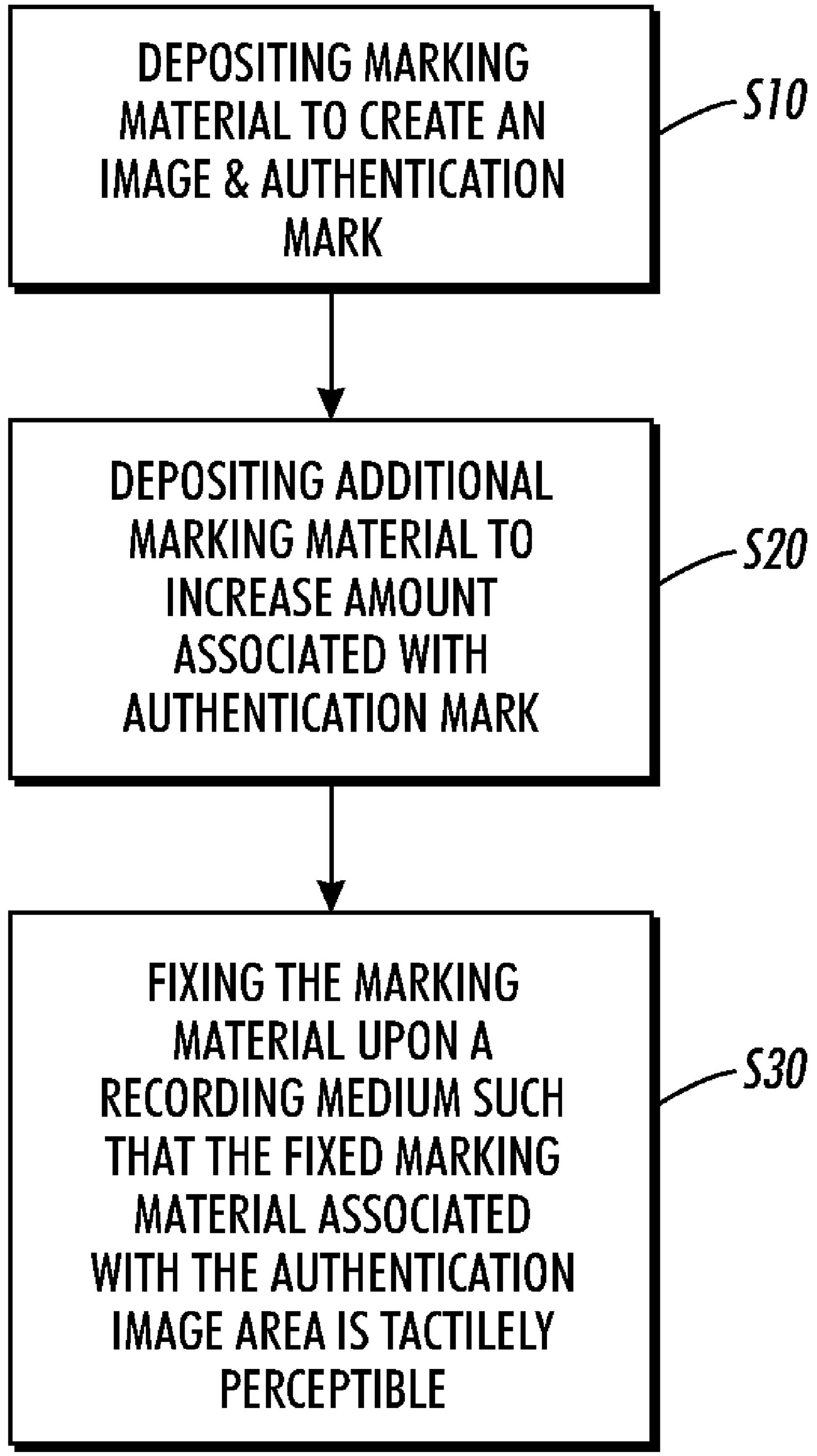
FIG. 5 is a flowchart of a method for creating a mark for authentication.

A flowchart of a method of authenticating a printed medium is shown in FIG. 5. At step S10, marking material is deposited to create an image and authentication mark. At step S20, additional marking material is deposited to increase the amount of marking material associated with authentication mark. Lastly, at step S30, the marking material is fixed upon a recording medium such that the fixed marking material associated with the authentication image area is tactilely perceptible.

It is noted that a predetermined mark should be used so that the authenticator of the printed medium will be apprised of the authentication criteria.

As noted above, the predetermined mark is transferred to the medium. One example of the transfer of the predetermined mark is using solid ink jetted onto an imaging drum.

The imaging drum is used to transfer the image to the medium. It is noted that multiple transfer passes may be needed to attain a tactilely perceptible ink pile height.

The authenticator of the printed medium uses the sense of touch to determine if the authentication mark is present. If the mark is not present, the medium is not authenticated. It is noted that the authenticating mark may be present visually, but the mark is still not authenticated unless it can be detected tactilely. The medium with the tactilely perceptible authenticating mark may be duplicated using a conventional scanner or copier. However, the duplicate, although it may have a visually perceptible authenticating mark, will not have the tactilely perceptible authenticating mark.

It is noted that the authenticating mark may be selected using hardware or software connected to a printer through a conventional computer network.

Although the above examples discuss using solid inkjet printing, xerography (toner) can also be readily utilized. As in solid inkjet printing, xerographic printing can render a document where all or a portion of the printed image can be tactilely perceived.

It is noted that the portion of the image to be tactilely perceived will be the identifying signature or mark used for authentication. The identifying mark could be a letterhead, an image of a personal signature, or a tactilely perceptible code.

It is noted that multiple printing passes may be used to cause the identifying mark to have a marking material pile height that is tactilely perceptible. For example, a marking material pile height of at least 31 microns is perceptible through the sense of touch, whereas conventional solid ink printing or xerography produces a marking material pile height of no more that 10 microns which is not tactilely perceptible.

In summary, an authentication mark is created on a recording medium by depositing marking material on a recording medium in an image area to create a tactilely non-perceptible image and in an authentication image area to create a tactilely non-perceptible marking material authentication image; depositing a predetermined amount of additional marking material upon the recording medium in the authentication image area to increase an amount of marking material associated with the marking material authentication image; and fixing the marking material upon the recording medium such that the fixed marking material associated with the authentication image area is a tactilely perceptible authentication mark.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of creating an authentication mark on a recording medium, comprising:

(a) depositing marking material on a medium in an image area to create a marking material image and in an authentication image area to create a marking material authentication image;

(b) depositing a predetermined amount of additional marking material upon the deposited marking material located in the authentication image area to increase an amount of marking material associated with the marking material authentication image in the authentication image area;

(c) transferring the deposited marking material and the deposited predetermined amount of additional marking material from the medium to a recording medium; and (d) fixing the transferred marking material upon the recording medium such that the fixed marking material associated with the authentication image area is a tactilely perceptible authentication mark, the fixed marking material associated with the tactilely perceptible authentication mark having a first height, the first height being tactilely perceptible.

2. The method as claimed in claim 1, wherein the fixed marking material associated with the image area is a second height, the second height being tactilely non-perceptible.

3. The method as claimed in claim 1, wherein the first height is at least 31 microns.

4. The method as claimed in claim 1, wherein the tactilely perceptible authentication mark is a letterhead.

5. The method as claimed in claim 1, wherein the tactilely perceptible authentication mark is a personal signature.

6. The method as claimed in claim 1, wherein the tactilely perceptible authentication mark is a logo.

7. The method as claimed in claim 1, wherein the marking material is solid ink.

8. The method as claimed in claim 1, wherein the marking material is toner.

9. A method of creating an authentication mark on a recording medium, comprising:

(a) depositing marking material on a recording medium in an image area to create a marking material image and in an authentication image area to create a marking material authentication image;

(b) depositing a predetermined amount of additional marking material upon the deposited marking material located in the authentication image area to increase an amount of marking material associated with the marking material authentication image in the authentication image area; and (c) fixing the deposited marking material and the deposited predetermined amount of additional marking material upon the recording medium such that the fixed marking material associated with the authentication image area is a tactilely perceptible authentication mark, the fixed marking material associated with the tactilely perceptible authentication mark having a first height, the first height being tactilely perceptible.

10. The method as claimed in claim 9, wherein the fixed marking material associated with the image area is a second height, the second height being tactilely non-perceptible.

11. The method as claimed in claim 9, wherein the first height is at least 31 microns.

12. The method as claimed in claim 9, wherein the tactilely perceptible authentication mark is a letterhead.

13. The method as claimed in claim 9, wherein the tactilely perceptible authentication mark is a personal signature.

14. The method as claimed in claim 9, wherein the tactilely perceptible authentication mark is a logo.

15. The method as claimed in claim 9, wherein the marking material is solid ink.

16. The method as claimed in claim 9, wherein the marking material is toner.

* * * * *